(12) United States Patent
Yoo et al.

(10) Patent No.: US 9,920,153 B2
(45) Date of Patent: Mar. 20, 2018

(54) METHOD OF PREPARING THERMOPLASTIC RESIN COMPOSITION HAVING SUPERIOR SURFACE CLEARNESS AND GLOSS

(71) Applicant: LG CHEM, LTD., Seoul (KR)

(72) Inventors: Keun Hoon Yoo, Daejeon (KR); Bong Keun Ahn, Daejeon (KR); Dae Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 21 days.

(21) Appl. No.: 14/427,987

(22) PCT Filed: Jun. 23, 2014

(86) PCT No.: PCT/KR2014/005539
§ 371 (c)(1),
(2) Date: Mar. 12, 2015

(87) PCT Pub. No.: WO2014/208965
PCT Pub. Date: Dec. 31, 2014

(65) Prior Publication Data
US 2016/0096957 A1 Apr. 7, 2016

(30) Foreign Application Priority Data

Jun. 28, 2013 (KR) .................. 10-2013-0075323
Jun. 12, 2014 (KR) .................. 10-2014-0071139

(51) Int. Cl.
| | |
|---|---|
| C08L 51/04 | (2006.01) |
| C08F 279/04 | (2006.01) |
| C08L 25/12 | (2006.01) |
| C08L 35/06 | (2006.01) |

(52) U.S. Cl.
CPC .............. C08F 279/04 (2013.01); C08L 25/12 (2013.01); C08L 35/06 (2013.01)

(58) Field of Classification Search
CPC ....................................................... C08L 51/04
USPC ............................................................ 524/571
See application file for complete search history.

(56) References Cited

U.S. PATENT DOCUMENTS

2007/0227221 A1* 10/2007 Yamamoto .............. B21C 23/04
72/271
2014/0094556 A1* 4/2014 Ahn ........................ C08F 279/04
524/504

FOREIGN PATENT DOCUMENTS

| JP | 2006-274144 A | 10/2006 |
|---|---|---|
| KR | 10-2002-0039855 A | 5/2002 |
| KR | 10-0570430 B1 | 4/2006 |
| KR | 10-2008-0017640 A | 2/2008 |
| KR | 10-2012-0073999 A | 7/2012 |
| WO | WO2013/105737 * | 7/2013 |

OTHER PUBLICATIONS

International Search Report for PCT/KR2014/005539 filed on Jun. 23, 2014.

* cited by examiner

*Primary Examiner* — Deve E Valdez

(57) ABSTRACT

Disclosed are a method of preparing a thermoplastic resin composition having superior surface clearness and gloss. More particularly, the present invention relates to a method of preparing a superior thermoplastic resin composition which has superior surface clearness and superior gloss and may prevent mold deposition during a high speed injection process, by using a reactive emulsifier during emulsion polymerization of rubber latex composed of polybutadiene, preparing resin latex using a hydrophobic initiator during graft copolymerization of rubber latex, an aromatic vinyl monomer, and a vinyl cyan monomer, compression dehydrating a moisture content to less than 10% using a compression type dehydrator after agglomerating the resin latex, and performing a wet powder extrusion process.

15 Claims, No Drawings

METHOD OF PREPARING THERMOPLASTIC RESIN COMPOSITION HAVING SUPERIOR SURFACE CLEARNESS AND GLOSS

CROSS-REFERENCE TO RELATED APPLICATIONS

The present application is a National Stage of International Patent Application No. PCT/KR2014/005539 filed on Jun. 23, 2014, which claims priority to Korean Patent Application No. 10-2014-0071139 filed on Jun. 12, 2014, and No. 10-2013-0075323 filed on Jun. 28, 2013, the disclosures of which are hereby incorporated in their entirety by reference.

TECHNICAL FIELD

The present invention relates to a method of preparing a thermoplastic resin composition having superior surface clearness and gloss. More particularly, the present invention relates to a method of preparing a superior thermoplastic resin composition which has superior surface clearness and gloss and may prevent mold deposition during a high speed injection process, by using a reactive emulsifier during emulsion polymerization of rubber latex composed of polybutadiene, preparing resin latex using a hydrophobic initiator during graft copolymerization of rubber latex, an aromatic vinyl monomer, and a vinyl cyan monomer, compression dehydrating a moisture content to less than 10% using a compression type dehydrator after agglomerating the resin latex, and performing a wet powder extrusion process.

BACKGROUND ART

An acrylonitrile-butadiene-styrene copolymer resin (hereinafter, referred to as "ABS resin") has superior mechanical properties and chemical resistance, and exhibits excellent colorability, machinability, and the like. Accordingly, the acrylonitrile-butadiene-styrene copolymer resin is broadly used in interior and exterior components of electrical and electronic products, vehicles, small toys, furniture, construction materials, and the like. A method of preparing an ABS resin comprises emulsion polymerizing a butadiene monomer to prepare polybutadiene rubber latex, graft copolymerizing the polybutadiene rubber latex with an aromatic vinyl monomer and a vinyl cyan monomer to prepare resin latex, dehydrating the resin latex using a dehydrator after agglomerating the resin latex, and drying the dehydrated resin latex using a dryer, thereby obtaining an ABS resin having a general pellet type. The obtained pellet-typed ABS resin is generally processed into a desired type by extruding and/or injection molding with styrene-acrylonitrile copolymer resin (hereinafter, referred to as "SAN resin") prepared through solution polymerization.

However, in most methods of preparing an ABS resin, emulsion polymerization using a general emulsifier such as rosin, fat, or the like is employed. Accordingly, after polymerization, impurities such as an emulsifier, an electrolyte, and the like, and monomer remainders remain, and, as such, surface clearness and gloss are limited due to gas generation during a high speed injection process and there are problems such as mold deposition and the like.

Therefore, to improve the problems, a method of preparing an ABS resin using a mass polymerization method is partially used. However, an ABS resin prepared by mass polymerization exhibits reduced gloss and has limitations on obtaining a high-impact thermoplastic resin.

Recently, there are intense efforts to improve quality of household appliances such as smart TVs, air conditioners, and the like, and diversify designs thereof. Development of materials corresponding to such efforts is urgently required. In addition, development of materials having superior thermal stability and not exhibiting mold deposition, during an injection process and a high-speed injection process for mass production, is required. Furthermore, development of environmentally friendly low emission materials is required.

DISCLOSURE

Technical Problem

Therefore, the present invention has been made in view of the above problems, and it is one object of the present invention to provide a method of preparing a thermoplastic resin composition having superior surface clearness and not exhibiting mold deposition by polymerizing with a reactive emulsifier, instead of rosin or a fat emulsifier, during preparation of polybutadiene rubber latex through emulsion polymerization and graft copolymerization of the polybutadiene rubber latex, an aromatic vinyl monomer, and a vinyl cyan monomer, to prevent generation of a small amount of gas and remove factors causing mold deposition, particularly during extrusion and/or injection molding, at high temperature, based on the idea that reduced surface clearness and mold deposition mainly occur by using rosin or a fat emulsifier.

It is another object of the present invention to provide a method of preparing a thermoplastic resin composition which may prevent rubber distortion due to high shear during a high speed injection process by inducing inner grafting (the aromatic vinyl monomer and the vinyl cyan monomer are swelled into the polybutadiene rubber latex and thereby being grafted) of large amounts of the aromatic vinyl monomer and the vinyl cyan monomer into the polybutadiene rubber latex in a large amount through use of a hydrophobic initiator during the graft copolymerization and has superior injection residence gloss.

It is another object of the present invention to provide a method of preparing a thermoplastic resin composition which may minimize contents of impurities reducing thermal stability of a finally obtained resin by lowering a moisture content of wet powder to less than 10% using a compression type dehydrator during dehydration to increase a dehydration ratio after agglomerating the obtained graft copolymerized latex and thereby maximally emitting impurities of the resin latex with water during dehydration.

It is yet another object of the present invention to provide a method of preparing a thermoplastic resin composition which may minimize impurities related to surface clearness, thermal stability, or mold deposition by applying a wet powder extrusion process during an extrusion process when the wet powder of the resin latex having a moisture content of less than 10% is extruded and kneaded with styrene-acrylonitrile copolymer resin prepared through mass polymerization or solution polymerization, so as to remove unreacted monomers, oligomers, and the like as azeotropy with water when water is volatilized due to vacuum added during wet powder extrusion.

Technical Solution

In accordance with one aspect of the present invention, provided is a method of preparing a thermoplastic resin composition comprising (1) preparing rubber latex from conjugated diene monomers using a reactive emulsifier; (2) graft copolymerizing an aromatic vinyl monomer and a vinyl cyan monomer with the rubber latex to prepare graft resin latex using a hydrophobic initiator; (3) dehydrating after agglomerating the graft resin latex to obtain wet powder; and (4) preparing an extruded material through wet powder extrusion of the wet powder with an aromatic vinyl-vinyl cyan copolymer.

As one embodiment, in step (2), a reactive emulsifier may be used during the graft copolymerization.

As one embodiment, in step (3), the dehydration may be carried out through a compression type dehydration method.

As one embodiment, in step (3), a moisture content of the wet powder may be 2 to 15 wt %.

As one embodiment, in step (4), the wet powder extrusion may be carried out under a vacuum condition of 1 to 760 torr.

As one embodiment, the wet powder extrusion may be carried out under a vacuum suction condition of 1 to 760 torr.

As one embodiment, in step (4), the wet powder extrusion may comprise a water evaporation process.

As one embodiment, in the wet powder extrusion of step (4), the aromatic-vinyl cyan copolymer may be added after adding the wet powder.

As one embodiment, the wet powder extrusion of step (4) may be continuously carried out without a dry process after the dehydration of step (3).

In accordance with another aspect of the present invention, provided is a thermoplastic resin composition prepared according to the method of preparing the thermoplastic resin composition.

In addition, the method of preparing the thermoplastic resin composition having superior surface clearness and superior gloss according to the present invention may comprise (1) preparing the rubber latex from the conjugated diene monomers using the reactive emulsifier; (2) preparing the resin latex by graft copolymerizing the aromatic vinyl monomer and the vinyl cyan monomer with the rubber latex using the reactive emulsifier and the hydrophobic initiator; (3) dehydrating to obtain the wet powder having a moisture content of 2 to 15% through mechanical dehydration, after agglomerating the resin latex; and (4) wet powder extruding the wet powder with the aromatic vinyl-vinyl cyan copolymer to prepare a pellet.

In addition, the method of preparing the thermoplastic resin composition having superior surface clearness and superior gloss according to the present invention may comprises (1) preparing rubber latex using 1.0 to 3.0 parts by weight of the reactive emulsifier based on 100 parts by weight of the conjugated diene monomers; (2) emulsion polymerizing a reaction mixture obtained by mixing 18 to 40 wt % of the aromatic vinyl monomer, 8 to 18 wt % of the vinyl cyan monomer, 0.1 to 0.7 wt % of the reactive emulsifier, 0.1 to 0.4 wt % of the hydrophobic initiator, and the remainder of the obtained rubber latex to prepare graft copolymer resin latex; (3) dehydrating such that a moisture content of the resin latex reaches 2 to 15% after agglomerating the resin latex to obtain wet powder; and (4) wet powder extruding such that a rubber content in a final resin is 10 to 30 wt % when the wet powder is extruded with the aromatic vinyl-vinyl cyan copolymer.

The reactive emulsifier may be a reactive emulsifier selected from the group consisting of an anionic and neutral polymer-type emulsifier having an allyl group, an anionic and neutral polymer-type emulsifier having a (meta)acryloyl group, an anionic or neutral polymer-type emulsifier having a propenyl group, and mixtures thereof.

In the step of preparing the rubber latex, a gel content control agent may be further comprised in an amount of 0.1 to 1.0 parts by weight.

The gel content control agent may be selected from the group consisting of ethyl-2-mercaptoethylpropionate, 2-mercaptoethylpropionate, 2-mercaptoethanol, mercaptoacetic acid, n-octylmercaptan, n-dodecylmercaptan, t-dodecylmercaptan and mixtures thereof.

The conjugated diene monomer may be selected from the group consisting of 1,3-butadiene, isoprene, chloroprene, piperylene and mixtures thereof.

The rubber latex may have a swelling index of 5 to 25 or less.

The rubber latex may have an average particle diameter of 2500 to 3800 Å.

The rubber latex may have a gel content of 70 to 95%.

In the step of preparing the resin latex, a molecular weight control agent may be further comprised in an amount of 0.1 to 0.4 wt %.

The molecular weight control agent used in the step of preparing the resin latex may be selected from the group consisting of ethyl-2-mercaptoethylpropionate, 2-mercaptoethylpropionate, 2-mercaptoethanol, mercaptoacetic acid, n-octylmercaptan, n-dodecylmercaptan, t-dodecylmercaptan, and mixtures thereof.

The aromatic vinyl monomer used in the step of preparing the resin latex may be selected from the group consisting of styrene, α-methyl styrene, p-methyl styrene, vinyltoluene, t-butyl styrene, chlorostyrene, substituents thereof, and mixtures thereof.

The vinyl cyan monomer used in the step of preparing the resin latex may be selected from the group consisting of acrylonitrile, methacrylonitrile, substituents thereof, and mixtures thereof.

The hydrophobic initiator used in the step of preparing the resin latex may be cumene hydroperoxide, diisopropylbenzene hydroperoxide, tert-butyl hydroperoxide, para methane hydroperoxide, or benzoyl peroxide as a fat-soluble peroxide initiator; a metal salt selected from the group consisting of metal salts such as iron (II), iron (III), cobalt (II), cerium (IV), and mixtures thereof, as an oxidation-reduction system polymerization initiator; or a reductant selected from the group consisting of reductants such as dextrose, glucose, fructose, dihydroxyacetone, polyamine, and mixtures thereof.

A weight average molecular weight of the resin latex may be 50,000 to 150,000.

The resin latex agglomerated as described above may be obtained in a wet powder type, in which a moisture content is 2 to 15 wt %, preferably 2 to 12 wt %, more preferably 5 to 10 wt %, through mechanical dehydration. Within this moisture content range, unreacted monomers, oligomers, and the like may be effectively removed as azeotropes with water.

The dehydration may be carried out by mechanically applying pressure. Preferably, the dehydration may be carried out by again dehydrating using a compression type dehydrator after dehydrating using a centrifugal dehydrator.

The wet powder extrusion may be carried out by co-extruding the wet powder of the resin latex and the aromatic vinyl-vinyl cyan copolymer while applying vacuum to reduce pressure in a co-extruder to atmospheric pressure or less.

In the wet powder extrusion, addition of the aromatic vinyl-vinyl cyan copolymer is carried out after adding the wet powder of the resin latex to the co-extruder. In this regard, co-extrusion of the wet powder of the resin latex and the aromatic vinyl-vinyl cyan copolymer may be carried out while applying vacuum to reduce pressure in the co-extruder to atmospheric pressure or less before and after addition of the aromatic vinyl-vinyl cyan copolymer.

Advantageous Effects

As apparent from the fore-going, the present invention advantageously provides a method of preparing a superior thermoplastic resin composition which has superior surface clearness and superior gloss and may prevent mold deposition during a high speed injection process, by using a reactive emulsifier during emulsion polymerization of rubber latex composed of polybutadiene, preparing resin latex using a hydrophobic initiator during graft copolymerization of rubber latex, an aromatic vinyl monomer, and a vinyl cyan monomer, compression dehydrating a moisture content to less than 10% using a compression type dehydrator after agglomerating the resin latex, and performing a wet powder extrusion process.

BEST MODE

Hereinafter, the present invention will be described in detail.

A method of preparing a thermoplastic resin composition having superior surface clearness and superior gloss according to the present invention may comprise (1) preparing the rubber latex from the conjugated diene monomers using the reactive emulsifier; (2) preparing the resin latex by graft copolymerizing the aromatic vinyl monomer and the vinyl cyan monomer with the rubber latex using the reactive emulsifier and the hydrophobic initiator; (3) dehydrating to obtain the wet powder having a moisture content of 2 to 15% through mechanical dehydration, after agglomerating the resin latex; and (4) wet powder extruding the wet powder with the aromatic vinyl-vinyl cyan copolymer to prepare a pellet.

More particularly, the method of preparing the thermoplastic resin composition having superior surface clearness and superior gloss according to the present invention may comprise (1) preparing rubber latex using 1.0 to 3.0 parts by weight of the reactive emulsifier based on 100 parts by weight of the conjugated diene monomers; (2) emulsion polymerizing a reaction mixture obtained by mixing 18 to 40 wt % of the aromatic vinyl monomer, 8 to 18 wt % of the vinyl cyan monomer, 0.1 to 0.7 wt % of the reactive emulsifier, 0.1 to 0.4 wt % of the hydrophobic initiator, and the remainder of the obtained rubber latex to prepare graft copolymer resin latex; (3) mechanically dehydrating such that a moisture content of the resin latex reaches 2 to 15% after agglomerating the resin latex to obtain wet powder; and (4) wet powder extruding such that a rubber content in a final resin is 10 to 30 wt % when the wet powder is extruded with the aromatic vinyl-vinyl cyan copolymer.

The reactive emulsifier may be a reactive emulsifier selected from the group consisting of an anionic and neutral polymer-type emulsifier having an allyl group, an anionic and neutral polymer-type emulsifier having a (meta)acryloyl group, an anionic or neutral polymer-type emulsifier having a propenyl group, and mixtures thereof. The reactive emulsifier used in the present the present invention indicates an emulsifier having ability to chemically bind through polymerization.

As anionic emulsifiers having an allyl group, there are a sulfate salt of polyoxyethylene allyl glycidyl nonylphenyl ether. Meanwhile, as neutral emulsifiers having an allyl group, there are polyoxyethylene allyl glycidyl nonylphenyl ether and the like. As a sulfate salt of the polyoxyethylene allyl glycidyl nonylphenyl ether, ADEKARIA SOAP SE available from Asahi Denka in Japan may be used. In addition, as the polyoxyethylene allyl glycidyl nonylphenyl ether, ADEKARIA SOAP NE available from Asahi Denka in Japan may be used.

As an anionic emulsifier having a (meta)acryloyl group, there is ELEMINOL RS available from Sanyo Kasei in Japan. As a neutral emulsifier, there is RMA-560 available from Nippon Surfactant in Japan. As a polymer type emulsifier, there are UM and UX available from Toagosei in Japan. As a representative example of anionic emulsifiers having a propenyl group, there is an ammonium sulfate salt of polyoxyethylene allyl glycidyl nonyl propenyl phenyl ether. AQUARON HS produced by Daiichi Kogyo Seiyaku of Japan and LATEMUL produced by Kao of Japan, and AQUARON BC produced by Daiichi Kogyo Seiyaku of Japan as a neutral emulsifier are commercially available. As the reactive emulsifier, an anionic emulsifier is preferable. Neutral emulsifiers extend reaction time due to poor particle generation thereof and have lower stability than anionic emulsifiers, thereby causing coagulum. The reactive emulsifier may be used alone or as a mixture of two types or more.

The reactive emulsifier, for example, may be selected from the group consisting of sulfoethyl methacrylate (SEM), 2-acrylamido-2-methylpropane sulfonic acid (AMPS), sodium styrene sulfonate (NaSS), sodium dodecyl allyl sulfosuccinate (TREM LF-40, trade name), a copolymer of styrene and sodium dodecyl allyl sulfosuccinate, polyoxyethylene alkylphenyl ether ammonium sulfate (HITENOL-BC and HITENOL-KH, a C16-18 alkenyl succinic acid di-potassium salt (Latemul ASK and ELOPLA AS100 series, trade names), sodium methallyl sulfonate (SMAS), and mixtures thereof.

In the step of preparing the rubber latex, the reactive emulsifier may be used in an amount of 1.0 to 3.0 parts by weight, preferably 1.0 to 2.0 parts by weight, more preferably 1.2 to 1.8 parts by weight, based on 100 parts by weight of the conjugated diene monomers. When the reactive emulsifier is used in an amount within the ranges, a thermoplastic resin having superior surface clearness and not exhibiting mold deposition may be suitably obtained.

The step of preparing the rubber latex may be carried out by performing polymerization for 5 to 15 hours after simultaneously adding 50 to 100 parts by weight, out of 100 parts by weight of the conjugated diene monomer before polymerization initiation, and then by polymerizing for 10 to 20 hours after the remainder of the conjugated diene monomer simultaneously or sequentially. Here, the reactive emulsifier is added at an initial reaction step to improve stability of the rubber latex and the total use amount of the reactive emulsifier is preferably 2.0 parts by weight or less. As the reactive emulsifier, an anionic reactive emulsifier is preferable. When the conjugated diene monomer is added during reaction, the reactive emulsifier may be added alone or by mixing with a non-reactive emulsifier. Rubber latex generated as described above has minimized remaining impurities, thereby providing superior surface clearness and gloss when an ABS resin is applied thereto.

In the step of preparing the rubber latex, a gel content control agent is comprised in an amount of 0.1 to 1.0 parts by weight, preferably 0.1 to 0.6 parts by weight, more preferably 0.2 to 0.4 parts by weight, based on 100 parts by weight of the conjugated diene monomers, to obtain rubber latex having an average particle diameter of 2500 to 3800 Å and a gel content of 70 to 95%. The gel content control agent is preferably a mercaptan and may be selected from the group consisting of ethyl-2-mercaptoethylpropionate, 2-mercaptoethylpropionate, 2-mercaptoethanol, mercaptoacetic acid, n-octylmercaptan, n-dodecylmercaptan, t-dodecylmercaptan, which have superior volatility, and mixtures thereof.

The conjugated diene monomer may be selected from the group consisting of 1,3-butadiene, isoprene, chloroprene, piperylene, and mixtures thereof. The conjugated diene monomer may be used with an ethylene unsaturated monomer. The unsaturated monomer may be selected from the group consisting of preferably an aromatic vinyl monomer, a vinyl cyan monomer, and a mixture thereof used to prepare graft copolymer resin latex.

With respect to preparation of the rubber latex, detailed description will be given below:

In the present invention, reaction was carried out for 5 to 15 hours after simultaneously adding 50 to 100 parts by weight, out of 100 parts by weight of the conjugated diene monomer, 1.0 to 1.5 parts by weight of the reactive emulsifier, 0.1 to 0.6 parts by weight of a polymerization initiator, 0.2 to 1.0 parts by weight of an electrolyte, 0.1 to 0.5 parts by weight of a gel content control agent, and to 100 parts by weight of ion exchanged water. Subsequently, the remainder of the conjugated diene monomer, 0.1 to 0.5 parts by weight of the reactive emulsifier, and 0.05 to 0.5 parts by weight of the gel content control agent were added simultaneously or sequentially, and then polymerized for 10 to 20 hours at 70 to 85° C., thereby improving stability of latex. Accordingly, a use amount of the emulsifier does not exceed 2.0 parts by weight and, as such, rubber latex which may be used to prepare thermoplastic resin having superior surface clearness and superior gloss may be provided.

The polymerization initiator used in the step of preparing the rubber latex may be cumene hydroperoxide, diisopropylbenzene hydroperoxide, tert-butyl hydroperoxide, para methane hydroperoxide, or benzoyl peroxide as a fat-soluble peroxide initiator; a metal salt selected from the group consisting of metal salts such as iron (II), iron (III), cobalt (II), cerium (IV), and mixtures, as an oxidation-reduction system polymerization initiator; or a reductant selected from the group consisting of reductants such as dextrose, glucose, fructose, dihydroxyacetone, polyamine, and mixtures thereof. A water-soluble initiator such as a persulfate may be used.

The electrolyte may be at least one selected from the group consisting of potassium chloride (KCl), sodium chloride (NaCl), potassium bicarbonate ($KHCO_3$), sodium hydrogen carbonate ($NaHCO_3$), sodium carbonate ($Na_2CO_3$), potassium carbonate ($K_2CO_3$), potassium hydrogensulfate ($KHSO_3$), sodium hydrogensulfate ($NaHSO_3$), potassium pyrophosphate ($K_4P_2O_7$), sodium pyrophosphate ($Na_4P_2O_7$), potassium phosphate ($K_3PO_4$), sodium phosphate ($Na_3PO_4$), sodium monohydrogenphosphate ($Na_2HPO_4$), and potassium monohydrogenphosphate ($K_2HPO_4$).

The rubber latex may have a swelling index of 5 to 25 or less.

The rubber latex may have an average particle diameter of 2500 to 3800 Å.

The rubber latex may have a gel content of 70 to 95%.

In the present invention, properties and characteristics of the rubber latex may be measured as follows.

1) Gel Content and Swelling Index

Obtained rubber latex was solidified with a dilute acid or a metal salt and then cleaned. Subsequently, the rubber latex was dried for 24 hours in a 60° C. oven, resulting in a mass of rubber. The rubber mass was finely cut with a pair of scissors, resulting rubber segments. 1 g of rubber segments were inserted into 100 g of toluene and then stored for 48 hours at room temperature in a dark room. Subsequently, the segments were separated into sol and gel, and then a gel content and a swelling index thereof were measured according to Mathematical Formulas 1 and 2.

Gel content (%)=(weight of insoluble material (gel)/weight of sample)*100     [Mathematical Formula 1]

Swelling index=weight of swelled gel/weight of gel     [Mathematical Formula 2]

2) Particle Diameters and Distribution of Particle Diameters

Particle diameters and distribution of particle diameters were measured according to a Dynamic Light Scattering (DLS) method, in which a laser (Nicomp 370HPL produced by Particle Sizing Systems, USA) was used as a light source.

In addition, in the step of preparing the resin latex, the aromatic vinyl monomer is used in an amount of 18 to 40 wt %, preferably 20 to 35 wt %, most preferably 25 to 30 wt %, based on the total weight of the reactive mixture. When the aromatic vinyl monomer is used in the amount described above, yellowing is reduced and liquidity is not decreased. In addition, superior chemical resistance and impact strength are exhibited.

The vinyl cyan monomer is used in an amount of 8 to 18 wt %, preferably 10 to 15 wt %, most preferably 11 to 13 wt %, based on the total weight of the reactive mixture. When the vinyl cyan monomer is used in the amount described above, a yellowing phenomenon is reduced and liquidity is not decreased. In addition, superior chemical resistance and impact strength are exhibited.

In the step of preparing the resin latex, a molecular weight control agent may be further comprised in an amount of 0.1 to 0.4 wt %, preferably 0.2 to 0.5 wt %, most preferably 0.25 to 0.3 wt %, based on the total weight of the reactive mixture. When the molecular weight control agent is comprised in the amount described above, the resin latex has an advantageous molecular weight and, as such, liquidity is not reduced and sufficient impact strength and chemical resistance are exhibited.

The molecular weight control agent used in the step of preparing the resin latex may be selected from the group consisting of ethyl-2-mercaptoethylpropionate, 2-mercaptoethylpropionate, 2-mercaptoethanol, mercaptoacetic acid, n-octylmercaptan, n-dodecylmercaptan, t-dodecylmercaptan, and mixtures thereof.

The aromatic vinyl monomer used in the step of preparing the resin latex may be selected from the group consisting of styrene, α-methyl styrene, p-methyl styrene, vinyltoluene, t-butyl styrene, chlorostyrene, substituents thereof, and mixtures thereof.

The vinyl cyan monomer used in the step of preparing the resin latex may be selected from the group consisting of acrylonitrile, methacrylonitrile, substituents thereof, and mixtures thereof.

In the step of preparing the resin latex, the reactive emulsifier is used in an amount of 0.1 to 0.7 wt %, preferably 0.1 to 0.5 wt %, most preferably 0.1 to 0.3 wt %, based on the total weight of the reactive mixture. When the reactive emulsifier is used in the amount described above, coagulum is not generated and a high polymerization conversion ratio is exhibited. In addition, waste of an emulsifier may be prevented, thereby being economically effective.

The hydrophobic initiator used in the step of preparing the resin latex may be cumene hydroperoxide, diisopropylbenzene hydroperoxide, tert-butyl hydroperoxide, para methane hydroperoxide, or benzoyl peroxide, as a fat-soluble peroxide initiator; a metal salt selected from the group consisting of metal salts, namely, iron (II), iron (III), cobalt (II), cerium (IV), and mixtures thereof, as an oxidation-reduction system polymerization initiator; or a reductant selected from the group consisting of reductants such as dextrose, glucose, fructose, dihydroxyacetone, polyamine, and mixtures thereof. The hydrophobic initiator is used in an amount of 0.1 to 0.4 wt %, preferably 0.2 to 0.4 wt %, based on the total weight of the reactive mixture. When the hydrophobic initiator is used in the amount described above, a polymerization conversion ratio is not reduced and superior thermal stability is exhibited.

In the step of preparing the resin latex, the rubber latex used to fill the remainder is obtained according to the method described above. Preferably, the rubber latex has an average particle diameter of 2500 to 3800 Å and a gel content of 70 to 95%.

Generally, during graft copolymerization, a monomer mixture may be added by selectively using continuous addition, batch addition, or continuous addition and batch addition, and the addition methods are not specifically limited. Preferably, 5 to 40 wt % of the total of the monomer mixture is batch-added and the remainder of the monomer mixture is continuously added. In addition, during the graft copolymerization, temperature is elevated to 45 to 85° C. to control a graft reaction rate.

Time of the graft polymerization is preferably 4 hours or less. A polymerization conversion ratio after reaction is preferably 98.5 or more and a molecular weight of a polymer is preferably 50,000 to 150,000 g/mol as a weight average molecular weight.

Stability of the graft copolymer resin latex prepared above was judged by measuring solid coagulum (%) according to Mathematical Formula 3 below.

Solid coagulum (%)={weight (g) of coagulum generated in reactor/weight (g) of total of rubber and monomers}×100     [Mathematical Formula 3]

When the amount of the solid coagulum is less than 0.5 wt %, stability of latex is superior and the amount of coagulum is small. Accordingly, a graft polymer more suitable for the present invention may be obtained.

In addition, a graft ratio of the graft polymer is measured as follows. The resin latex being a graft polymer is solidified, cleaned, and dried, to obtain powder. 2 g of the obtained powder is inserted into 300 ml of acetone and stirred for 24 hours. The stirred solution is separated using an ultracentrifuge and then the separated acetone solution is added to methanol dropwise to obtain a part which is not grafted. The obtained part is dried and then the weight thereof is measured. Using the measured weight, a graft ratio is calculated according to Mathematical Formula 4 below.

Graft ratio (%)=(weight (g) of grafted monomers/ weight (g) of rubber)×100     [Mathematical Formula 4]

In this regard, when the graft ratio exceeds 20%, superior gloss is exhibited.

The graft copolymer resin latex prepared as described above may further comprise an antioxidant to prevent oxidation during processing. The antioxidant may be a phenolic antioxidant, a phosphoric antioxidant, or a sulfuric antioxidant, which are generally used. Preferably, the antioxidant is comprised in an amount of 0.1 to 2.0 parts by weight with respect to 100 parts by weight of the graft copolymerized latex, at a emulsified state having a particle diameter of 0.5 to 2 µm. Generally and preferably, the antioxidant is slowly added to the graft copolymer resin latex at 40 to 80° C. while continuously stirring before an agglomeration process.

A method of agglomerating the graft copolymer resin latex prepared as described above comprises aging after adding a metal salt or an acid, as a coagulant, to the graft copolymer resin latex. As the coagulant, magnesium sulfate ($MgSO_4$), calcium chloride ($CaCl_2$), aluminum sulfate ($Al_2(SO_4)_3$), sulfuric acid, phosphoric acid, hydrochloric acid, or the like is preferable.

The resin latex agglomerated as described above may be obtained in a wet powder type, in which a moisture content is 2 to 15 wt %, preferably 2 to 12 wt %, more preferably 5 to 10 wt %, through mechanical dehydration. The dehydration may be carried out by mechanically adding pressure, preferably dehydrating using a compression type dehydrator again after dehydrating using a centrifugal dehydrator. Generally, dehydration is carried out using a centrifugal dehydrator. When the centrifugal dehydrator is used for dehydration, a moisture content of powder obtained through the dehydration is approximately 30 wt %. On the other hand, when the compression type dehydrator is used according to the present invention, a moisture content of powder obtained through dehydration may be lowered up to approximately 10 wt %.

In the present invention, a moisture content may be calculated according to Mathematical Formula 5 below at 200° C.

Moisture content (%)=(weight (g) of latex resin pulverulent body before drying−weight (g) of latex resin pulverulent body after drying)/weight (g) of latex resin pulverulent body before drying× 100     [Mathematical Formula 5]

Subsequently, the wet powder may be coextruded with an aromatic vinyl-vinyl cyan copolymer prepared through mass polymerization or melt polymerization and, as such, may be prepared in a pellet type.

The aromatic vinyl-vinyl cyan copolymer is preferably a styrene-acrylonitrile (SAN) copolymer, which has a weight average molecular weight of 140,000 and comprises 24% of a vinyl cyan monomer, obtained through mass polymerization.

The wet powder and the aromatic vinyl-vinyl cyan copolymer are mixed such that a final amount of rubber of a finally obtained resin is preferably 10 to 30 wt %. Through a wet powder extrusion process, in which extrusion and kneading are carried out, comprising evaporating water of the wet powder with the aromatic vinyl-vinyl cyan copolymer, the thermoplastic resin having superior surface clearness and superior gloss according to the present invention is obtained, preferably in pellet form. That is, the wet powder extrusion may be carried out by co-extruding the wet powder of the resin latex and aromatic vinyl-vinyl cyan copolymer while applying vacuum to reduce pressure in a wet powder extruder to atmospheric pressure, namely, 760 torr, or less. Preferably, in the wet powder extrusion, addition of the aromatic vinyl-vinyl cyan copolymer is carried out after adding the wet powder of the resin latex to the co-extruder. In this regard, co-extrusion of the wet powder of the resin latex and the aromatic vinyl-vinyl cyan copolymer may be carried out while applying vacuum to reduce pressure in the co-extruder to atmospheric pressure or less before and after addition of the aromatic vinyl-vinyl cyan copolymer. In this case, contents of total remainders comprising monomer remainders in the resin are small and, as such, thermal stability and surface properties of the resin are greatly improved.

In another embodiment, the reduced pressure during the wet powder extrusion may be 1 to 760 torr, 1 to 100 torr, or 1 to 50 torr. When the reduced pressure is carried within this pressure range, optimal thermal stability and surface properties are exhibited.

Wet powder extrusion, in which extrusion and kneading are carried out, comprising evaporating water in a 200 to 250° C. extruder, may be carried out after further adding additives such as preferably a lubricant, a thermal stabilizer, and the like to the mixture of the wet powder and the aromatic vinyl-vinyl cyan copolymer.

In one embodiment, the water evaporation is a process to evaporate water at high temperature. In this process, remainders, boiling points of which are low, comprising monomer remainders in a resin may be effectively removed.

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

EXAMPLE

Example 1

(1) Preparation of Rubber Latex 75 parts by weight of ion exchanged water, 100 parts by weight of 1,3-butadiene as a monomer, 1.5 parts by weight of a C16-18 alkenyl succinic acid di-potassium salt (ELOPLA AS100) as a reactive emulsifier, 2.0 parts by weight of potassium carbonate ($K_2CO_3$) as an electrolyte, 0.3 parts by weight of tert-dodecylmercaptan (TDDM) as a molecular weight control agent, and 0.2 parts by weight of potassium persulfate as an initiator were simultaneously added to a polymerization reactor (autoclave) under a nitrogen atmosphere and then reacted for 10 hours at a reaction temperature of 70° C. When a polymerization conversion ratio of the reactor reached 50%, 0.05 wt % of tert-dodecylmercaptan was simultaneously added and reacted for 20 hours at 75° C. When a polymerization conversion ratio is 90%, a polymerization inhibitor was added thereto to terminate the reaction. The resultant rubber latex was analyzed. An average particle diameter of the resultant rubber latex was 3100 Å and a gel content thereof was 85%.

(2) Preparation of Graft Copolymer Resin Latex 60 parts by weight (solid content) of poly butadiene rubber latex having an average particle diameter of 3100 Å and a gel content of 85%, 70 parts by weight of ion exchanged water, 5 parts by weight of styrene as a monomer, and 2 parts by weight of acrylonitrile were added to a polymerization reactor (autoclave) substituted with nitrogen, and then temperature of the reactor was maintained to 50° C. Subsequently, 0.05 parts by weight of cumene hydroperoxide, 0.09 parts by weight of sodium pyrophosphate, 0.12 parts by weight of dextrose, and 0.002 parts by weight of ferrous sulfide were simultaneously added to the polymerization reactor. Subsequently, a mixture comprising 23 parts by weight of styrene, 10 parts by weight of acrylonitrile, 0.25 parts by weight of ethyl-2-mercaptoethylpropionate, and 0.12 parts by weight of cumene hydroperoxide was continuously added to the polymerization reactor while elevating a temperature of the mixture to 75° C. for 2 hours. In parallel, 0.2 parts by weight (based on a solid content, 28% aqueous solution) of a C16-18 alkenyl succinic acid di-potassium salt (ELOPLA AS100) as a reactive emulsifier was continuously added to the polymerization reactor for 2 hours. After terminating continuous addition, 0.06 parts by weight of cumene hydroperoxide, 0.04 parts by weight of sodium pyrophosphate, 0.06 parts by weight of dextrose, and 0.001 parts by weight of ferrous sulfide were added to the polymerization reactor. Temperature was elevated to 80° C. for 30 minutes and maintained for 30 minutes, and then reaction was terminated. Here, a polymerization conversion ratio was 99%, a content of coagulum was 0.03%, and a graft ratio was 38%.

After adding 0.5 parts by weight of an emulsion of an antioxidant (winstay-L/IR1076=0.8/0.2) having an average particle diameter of 0.9 μm to the graft copolymer resin latex, reaction of which was terminated, first agglomeration was carried out in the presence of 2.0 wt % of $MgSO_4$ at 85° C. and then second aging was carried out at 97° C. Subsequently, dehydration was carried out using a centrifugal dehydrator to obtain a powdery graft copolymer having a moisture content of approximately 30%. Resin powder of the obtained powdery graft copolymer having a moisture content of 30% was secondarily dehydrated again in a compression type dehydrator such that a moisture content became approximately 10%, to obtain wet powder.

(3) Kneading Process (Wet Powder Extrusion Process)

To an ABS graft copolymer in a wet powder state prepared as above, a general SAN resin (available from LG chemical in Republic of Korea, grade: 80 HF, prepared through mass polymerization; styrene-acrylonitrile copolymer having a weight average molecular weight of 140,000 and comprising 24% of acrylonitrile), a lubricant, an antioxidant, and a light stabilizer were added. Subsequently, kneading was carried using a wet powder extruder at 200 to 250° C. and the aromatic vinyl-vinyl cyan copolymer was added to the wet powder extruder after adding the wet powder of the resin latex to the wet powder extruder. The wet powder of the resin latex and the aromatic vinyl-vinyl cyan copolymer were co-extruded while applying vacuum to reduce inner pressure of the wet powder extruder to 8 torr before and after addition of the aromatic vinyl-vinyl cyan copolymer, to prepare pellets. The pellets were prepared into segments, rubber contents of which are 15%, and properties of the segments were measured. Here, water, monomer remainders, and the like were emitted through a vacuum line connected to a middle portion of the extruder.

The pellets were injected again to measure properties. Surface clearness was judged with the unaided eye. Properties such as gloss, impact strength, liquidity, and the like were measured according to ASTM methods (impact strength was measured according to ASTM D256, liquidity was measured according to ASTM D1238, and gloss was measured according to ASTM D528). Whiteness was measured using a Hunter color measuring instrument available from Hunter Labs, USA and compared. Thermal stability was compared through an injection residence test (during injection, residence for 20 minutes at 250° C.). Measured properties are summarized in Table 1.

Example 2

An experiment was carried out in the same manner as in Example 1, except that 0.2 parts by weight of HITENOL KH-10 as a reactive emulsifier was continuously added for 2 hours.

Example 3

An experiment was carried out in the same manner as in Example 1, except that 0.2 parts by weight of sodium dodecyl allyl sulfosuccinate (TREM LF-40) as a reactive emulsifier was continuously added for 2 hours.

Example 4

An experiment was carried out in the same manner as in Example 1, except that a mixture of 0.15 parts by weight of ethyl-2-mercaptoethylpropionate and 0.1 parts by weight of tert-dodecylmercaptan was used as a molecular weight controller.

Example 5

An experiment was carried out in the same manner as in Example 1, except that 70 parts by weight (solid content) of poly butadiene rubber latex having an average particle diameter of 3100 Å and a gel content of 85%, 100 parts by weight of ion exchanged water, 7.2 parts by weight of styrene as a monomer, and 2.8 parts by weight of acrylonitrile were added to a polymerization reactor (autoclave) substituted with nitrogen, and then temperature of the reactor was maintained at 50° C. Subsequently, 0.05 parts by weight of cumene hydroperoxide, 0.09 parts by weight of sodium pyrophosphate, 0.12 parts by weight of dextrose, and 0.002 parts by weight of ferrous sulfide were simultaneously added to the polymerization reactor. Subsequently, a mixture comprising 14.0 parts by weight of styrene, 6.0 parts by weight of acrylonitrile, 0.3 parts by weight of ethyl-2-mercaptoethylpropionate, and 0.12 parts by weight of cumene hydroperoxide was continuously added to the polymerization reactor while elevating a temperature of the mixture to 75° C. for 2.5 hours. In parallel, 0.2 parts by weight (based on solid content, 28% aqueous solution) of a C16-18 alkenyl succinic acid di-potassium salt (ELOPLA AS100) as a reactive emulsifier was continuously added to the polymerization reactor for 2.5 hours.

Comparative Example 1

An experiment was carried out in the same manner as in Example 1, except that 1.2 parts by weight of fatty acid soap instead of a reactive emulsifier and 0.4 parts by weight of tert-dodecylmercaptan as a molecular weight controller were continuously added for 3 hours. After continuous addition, 0.06 parts by weight of cumene hydroperoxide, 0.04 parts by weight of sodium pyrophosphate, 0.06 parts by weight of dextrose, and 0.001 parts by weight of ferrous sulfide were added and temperature was elevated to 80° C. for 30 minutes. Properties measured after terminating the reaction are summarized in Table 2.

Comparative Example 2

An experiment was carried out in the same manner as in Example 1, except that 0.3 parts by weight of persulfate, instead of cumene hydroperoxide, as an initiator and 0.4 parts by weight of tert-dodecylmercaptan as a molecular weight controller were continuously added for 3 hours. Measured properties are summarized in Table 2.

Comparative Example 3

Using only a centrifugal dehydrator instead of the compression type dehydrator and the wet powder extrusion, a pellet type resin having a moisture content of 0.8% was obtained by drying the resin powder having a moisture content of 30% with a dryer. The pellet type resin was extruded and kneaded using a general double screw extruder instead of wet powder extrusion. Measured properties are summarized in Table 2.

TABLE 1

|  | Example 1 | Example 2 | Example 3 | Example 4 | Example 5 |
|---|---|---|---|---|---|
| Graft ratio (%) | 38 | 39 | 38 | 37 | 32 |
| Surface clearness (judged with the unaided eye) | Excellent | Excellent | Excellent | Excellent | Excellent |
| Surface gloss | 110 | 109 | 110 | 109 | 07 |
| Impact strength (kg · cm/cm) | 31 | 32 | 31 | 30 | 28 |
| Liquidity (MFR) (g/10 min) | 23 | 24 | 24 | 22 | 20 |
| Resident gloss change rate (%) | 2 | 1 | 1 | 2 | 3 |
| Resident color difference reduction (ΔE) | <2.0 | | | | |
| Mold deposition properties (judged with the unaided eye) | Excellent | Excellent | Excellent | Excellent | Excellent |

TABLE 2

|  | Comparative Example 1 | Comparative Example 2 | Comparative Example 3 |
|---|---|---|---|
| Graft ratio (%) | 37 | 35 | 38 |
| Surface clearness (judged with the unaided eye) | Normal | Good | Normal |
| Surface gloss | 104 | 107 | 99 |
| Impact strength (kg · cm/cm) | 32 | 23 | 31 |
| Liquidity (MFR) (g/10 min) | 25 | 21 | 25 |
| Resident gloss change rate (%) | 5 | 4 | 4 |
| Resident color difference reduction (ΔE) | <5.0 | <3.0 | <4.0 |
| Mold deposition properties (judged with the unaided eye) | Normal | Good | Normal |

As shown in Tables 1 and 2, it can be confirmed that, according to the method of preparing the thermoplastic resin composition of the present invention, a superior thermoplastic resin having properties such as a graft ratio, impact strength, liquidity, and the like which are identical or similar to a general resin, having excellence in clearness and gloss such as surface clearness, surface gloss, resident gloss change rate, resident color difference reduction, and the like, and/or superior color effects, and not exhibiting mold deposition may be prepared.

What is claimed is:

1. A method of preparing a thermoplastic resin composition comprising:
    preparing rubber latex from conjugated diene monomers using a reactive emulsifier using 1.0 to 3.0 parts by weight of the reactive emulsifier based on 100 parts by weight of the conjugated diene monomers;
    graft copolymerizing an aromatic vinyl monomer and a vinyl cyan monomer with the rubber latex using a hydrophobic initiator by emulsion polymerizing a reaction mixture obtained by mixing 18 to 40 wt % of the aromatic vinyl monomer, 8 to 18 wt % of the vinyl cyan monomer, 0.1 to 0.7 wt % of the reactive emulsifier, 0.1 to 0.4 wt % of the hydrophobic initiator, and the remainder of the obtained rubber latex to prepare a graft copolymer resin latex;
    dehydrating the resin latex after agglomerating the graft resin latex to obtain wet powder; and
    preparing an extruded material through wet powder extrusion of the wet powder with an aromatic vinyl-vinyl cyan copolymer such that a rubber content in a final resin is 10 to 30 wt % when the wet powder is extruded with the aromatic vinyl-vinyl cyan copolymer,
    wherein the wet powder extrusion is carried out under a vacuum of 1 to 100 torr, and
    wherein, in the preparing, the wet powder extrusion is carried out by adding the aromatic-vinyl cyan copolymer after adding the wet powder.

2. The method according to claim 1, wherein, in the graft copolymerizing, a reactive emulsifier is used during the graft copolymerization.

3. The method according to claim 1, wherein, in the dehydrating, the dehydration is carried out through a compression dehydration method.

4. The method according to claim 1, wherein, in the dehydrating, a moisture content of the wet powder is 2 to 15 wt %.

5. The method according to claim 1, wherein, in the preparing, the wet powder extrusion comprises a water evaporation process.

6. The method according to claim 1, wherein, in the preparing, the wet powder extrusion is continuously carried out without a dry process after the dehydrating.

7. The method according to claim 1, wherein the reactive emulsifier comprises at least one selected from the group consisting of sulfate salt of polyoxyethylene allyl glycidyl nonylphenyl ether, polyoxyethylene allyl glycidyl nonylphenyl ether, ammonium sulfate salt of polyoxyethylene allyl glycidyl nonyl propenyl phenyl ether, sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid, di-potassium salt, and sodium methallyl sulfonate.

8. The method according to claim 1, wherein, in the preparing, a gel content control agent is further comprised in an amount of 0.1 to 1.0 parts by weight based on 100 parts by weight of the conjugated diene monomers.

9. The method according to claim 8, wherein the gel content control agent is selected from the group consisting of ethyl-2-mercaptoethylpropionate, 2-mercaptoethylpropionate, 2-mercaptoethanol, mercaptoacetic acid, n-octylmercaptan, n-dodecylmercaptan, t-dodecylmercaptan, and mixtures thereof.

10. The method according to claim 1, wherein, in the preparing, the rubber latex has a swelling index of 5 to 25 or less.

11. The method according to claim 1, wherein, in the preparing, the rubber latex has an average particle diameter of 2500 to 3800 Å.

12. The method according to claim 1, wherein, in the preparing, the rubber latex has a gel content of 70 to 95%.

13. The method according to claim 1, wherein, in the graft copolymerizing, a molecular weight control agent is further comprised in an amount of 0.1 to 0.4 wt %, based on a total weight, when the graft resin latex is prepared.

14. The method according to claim 1, wherein, in the graft copolymerizing, a molecular weight of the graft resin latex is 50,000 to 150,000 g/mol.

15. The method according to claim 3, wherein, in the dehydrating, the dehydrating is carried out by again dehydrating using a compression dehydrator after dehydrating using a centrifugal dehydrator.

* * * * *